(12) United States Patent
Amano et al.

(10) Patent No.: US 7,400,358 B2
(45) Date of Patent: Jul. 15, 2008

(54) CARD INSTALLATION DEVICE

(75) Inventors: Hiromi Amano, Osaka (JP); Yoshitada Moriyasu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 500 days.

(21) Appl. No.: 10/516,114

(22) PCT Filed: Mar. 10, 2004

(86) PCT No.: PCT/JP2004/003067

§ 371 (c)(1),
(2), (4) Date: Nov. 30, 2004

(87) PCT Pub. No.: WO2004/088977

PCT Pub. Date: Oct. 14, 2004

(65) Prior Publication Data

US 2005/0174477 A1    Aug. 11, 2005

(30) Foreign Application Priority Data

Mar. 31, 2003  (JP) ............................. 2003-094932

(51) Int. Cl.
*H04N 5/225* (2006.01)
(52) U.S. Cl. ....................... 348/375; 348/373; 348/374; 348/375; 348/376
(58) Field of Classification Search .......... 348/373–376
See application file for complete search history.

(56) References Cited

U.S. PATENT DOCUMENTS

| D276,999 | S  | * | 1/1985 | Arimura | ................... D14/165 |
| 5,515,174 | A  | * | 5/1996 | Abe et al. | ................... 386/118 |
| 6,493,033 | B1 | * | 12/2002 | Glogan et al. | ............... 348/375 |
| 6,665,744 | B2 | * | 12/2003 | Shimamoto | ................. 710/15 |

FOREIGN PATENT DOCUMENTS

| JP | 3-54068 | 5/1991 |
| JP | 5-35931 | 2/1993 |
| JP | 5-81848 | 4/1993 |
| JP | 11-95867 | 4/1999 |
| JP | 11-308510 | 11/1999 |
| JP | 2003-101843 | 4/2003 |

* cited by examiner

*Primary Examiner*—Tuan V Ho
*Assistant Examiner*—Tuan H Le
(74) *Attorney, Agent, or Firm*—McDermott Will & Emery LLP (57) ABSTRACT

The card attachment apparatus is provided such that, when a card-like recording medium is inserted or pulled out, the attachment unit is rotated a predetermined angle to project from the device and a blocking cover is simultaneously pulled in, thereby allowing memory card to be pinched and taken out in an easy manner. This attachment unit has top face cover on which operation button is provided, thereby eliminating a space in a main body of camcorder in which operation button is provided. When opening section is moved, the attachment unit is opened and the memory card can be inserted or pulled out.

6 Claims, 7 Drawing Sheets

PRIOR ART

FIG. 7

PRIOR ART

CARD INSTALLATION DEVICE

TECHNICAL FIELD

The present invention relates to a card attachment apparatus in which a memory card used for a camcorder or a digital still camera or the like is inserted or removed.

BACKGROUND ART

Recently, more camcorders or digital still cameras or the like have a function to record or reproduce, by receiving a small-sized memory card, a still image or a moving image. Such devices frequently used for entertainment or hobby purposes are strongly required to satisfy requirements regarding the operationality, downsizing, style, and design. A card attachment apparatus to which a memory card is inserted and from which a memory card is removed in particular has been strongly required to provide an improvement in the operationality, downsizing, style, and design.

Hereinafter, a conventional card attachment apparatus will be described.

Figure 6:
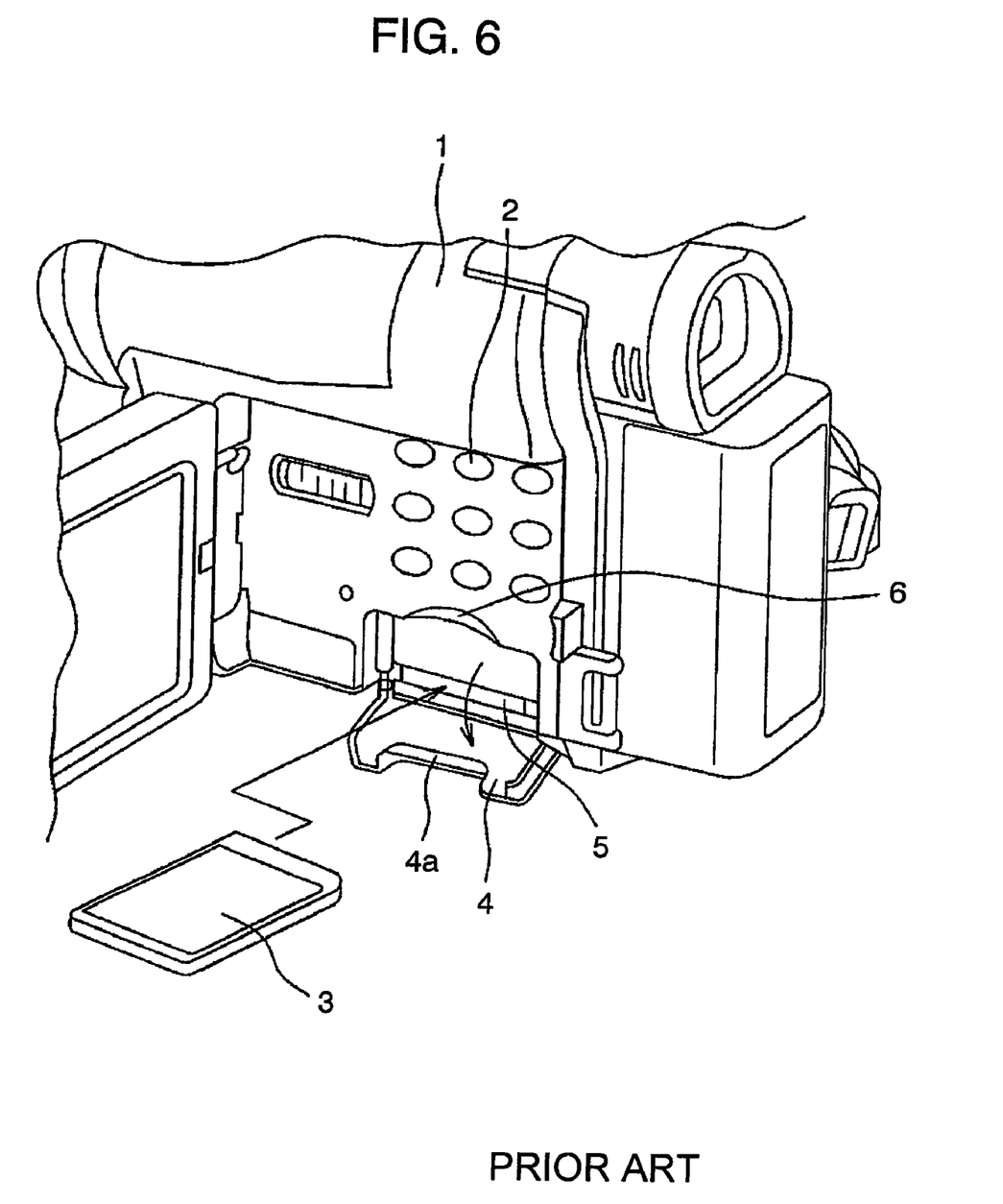
FIG. 6 is a perspective view of the main part of a conventional card attachment apparatus (when a memory card is inserted thereto).
Figure 7:
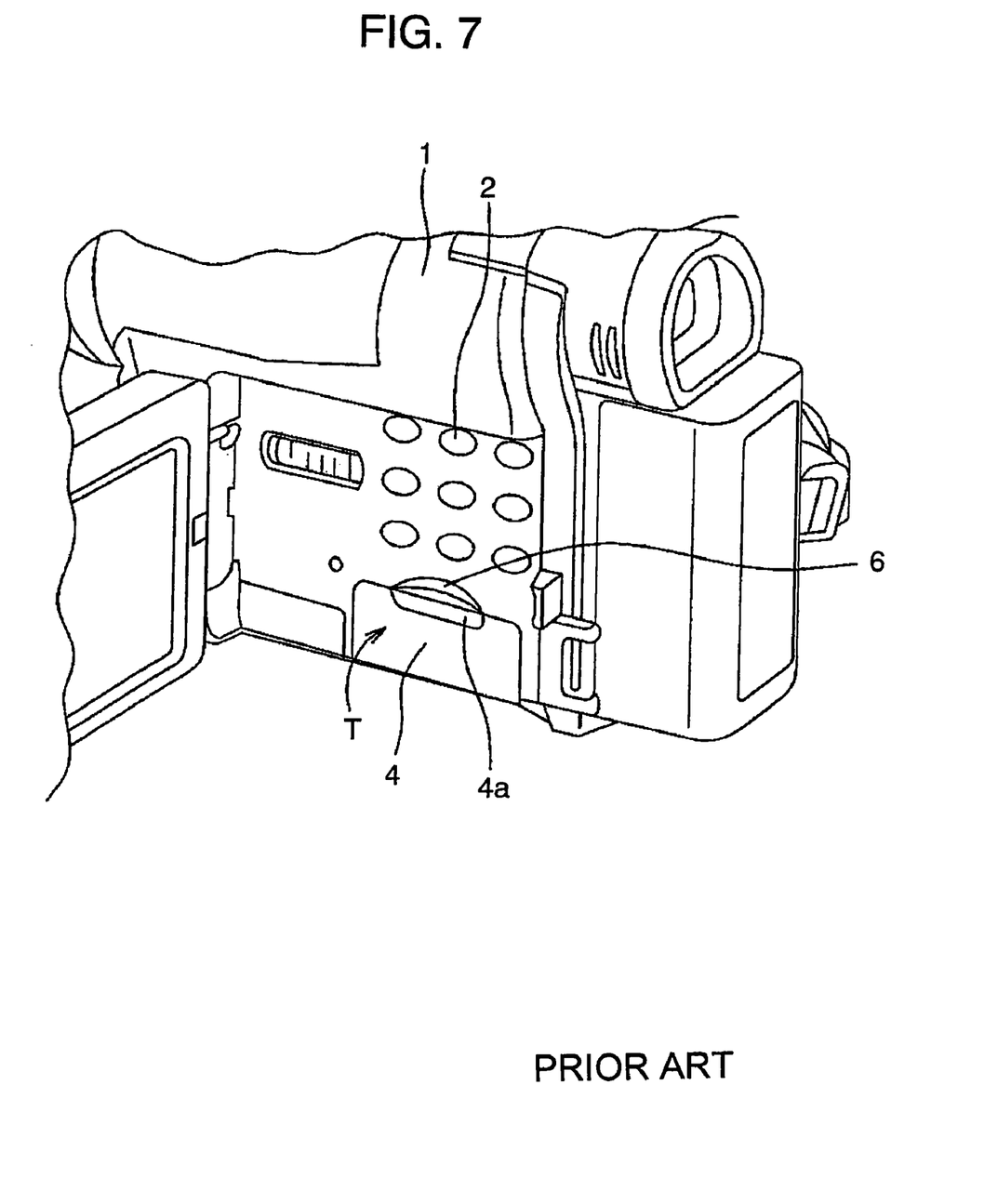
FIG. 7 is a perspective view of the main part of the conventional card attachment apparatus (when an open/close cover is closed).

FIG. 6 and FIG. 7 show a conventional card attachment apparatus. FIG. 6 shows a status in which a memory card as a card-like recording medium is inserted and FIG. 7 shows a status in which an open/close cover which is a part of the card attachment apparatus is closed, respectively. In the drawings, the same components are denoted with the same reference numerals.

First, as shown in FIG. 6, camcorder device 1 has operation buttons 2 for the operation thereof. A card connector (not shown) to which memory card 3 is inserted to provide electrical connection is fixed in camcorder 1 (method for fixing the card connector is not shown).

Open/close cover 4 is provided on camcorder 1 in order to cover, when memory card 3 is not inserted or removed, opening section 5 of card connector.

Open/close cover 4 has a spindle by which open/close cover 4 can be rotated so as to selectively move between the first position (FIG. 6) at which the opening section to which or from which a card-like recording medium is inserted or pulled out is released and the second position (FIG. 7) at which the opening section is closed by storing open/close cover 4 in the device.

Open/close cover 4 has a cover cut-out section 4a to which fingers are put on when open/close cover 4 is opened.

Device 1 includes device cut-out section 6 to which fingers are inserted when memory card 3 is pinched and taken out.

The card attachment apparatus having the structure as described above will be described with regards to the operation.

As shown in FIG. 6, when memory card 3 is inserted or removed, open/close cover 4 is opened and memory card 3 is inserted to or removed from opening section 5. Thereafter, as shown in FIG. 7, open/close cover 4 is pushed up and closed in the direction shown by arrow T. Open/close cover 4 is maintained to be closed by a lock mechanism (not shown).

The technique of this type is introduced, for example, in Japanese Patent Laid-Open Application No. 2002-42059.

However, the above conventional structure requires device cut-out section 6 having a large size as shown in FIG. 6 to cause the interference between device cut-out section 6 and a space in which operation buttons 2 are provided. Due to this reason, the above conventional structure has required a wide area and thus has been prevented from being downsized.

DISCLOSURE OF THE INVENTION

It is an objective of the present invention to provide a card attachment apparatus that can provide the downsizing of the device.

In order to achieve this objective, the card attachment apparatus of the present invention includes: an attachment unit that is selectively moved between a first position at which the attachment unit is rotated against the device main body for a predetermined angle to project from the device main body so that an opening section to which or from which a card-like recording medium is inserted or pulled out is released and a second position at which the attachment unit is stored in the device main body to close the opening section, wherein: the attachment unit includes a top face cover for covering a card connector for attaching or detaching the card recording medium and an operation button that is provided on the top face cover and that is used for operating the device.

This structure can provide a card attachment apparatus that can provide the downsizing of the device.

The present invention includes: an attachment unit that is selectively moved between a first position at which the attachment unit is rotated against the device main body for a predetermined angle to project from the device main body so that an opening section to which or from which a card-like recording medium is inserted or pulled out is released and a second position at which the attachment unit is stored in the device main body to close the opening section, wherein: the attachment unit includes a top face cover for covering a card connector for attaching or detaching the card recording medium and an operation button that is provided on the top face cover and that is used for operating the device. This provides an effect of eliminating the need for separately providing, on the surface of the device, a mechanism through which the card-like recording medium is inserted or pulled out and the operation button, thus providing the downsizing of the device.

Also according to the present invention, the top face cover has at one end thereof a cut-out section for partially exposing the card-like recording medium so that the card-like recording medium can be inserted or pulled out at the first position.

Also according to the present invention, the top face cover has a blocking cover for blocking the cut-out section at the second position.

These features provide an effect by which a memory card as a recording medium can be inserted or pulled out in an easy manner, foreign material can be prevented from intruding, and the downsizing of the device can be provided while maintaining the operationality, style, and design.

Also according to the present invention, the blocking cover is made of a light transmission material and thus provides an effect of providing the downsizing of the device while having particularly-high sophisticated taste and design.

The present invention also includes a detection switch for detecting the movement from the first position to the second position and a control section for disabling, based on the result of the detection by the detection switch, the operation button for a predetermined time since the movement to the second position.

Also according to the present invention, the operation button has a space through which the attachment unit is pushed when being moved.

These features can provide an effect for providing the downsizing of the device while preventing a wrong operation of an operation section when the attachment unit is moved to the second position and maintaining the operationality, sophisticated taste, and design.

BEST MODE FOR CARRYING OUT THE INVENTION

Hereinafter, an embodiment of the present invention will be described with reference to the drawings.

(Embodiment)

Hereinafter, the present invention will be described mainly with reference to FIG. 1 but also with reference to FIG. 2, FIG. 3, FIG. 4, and FIG. 5.

Figure 1:
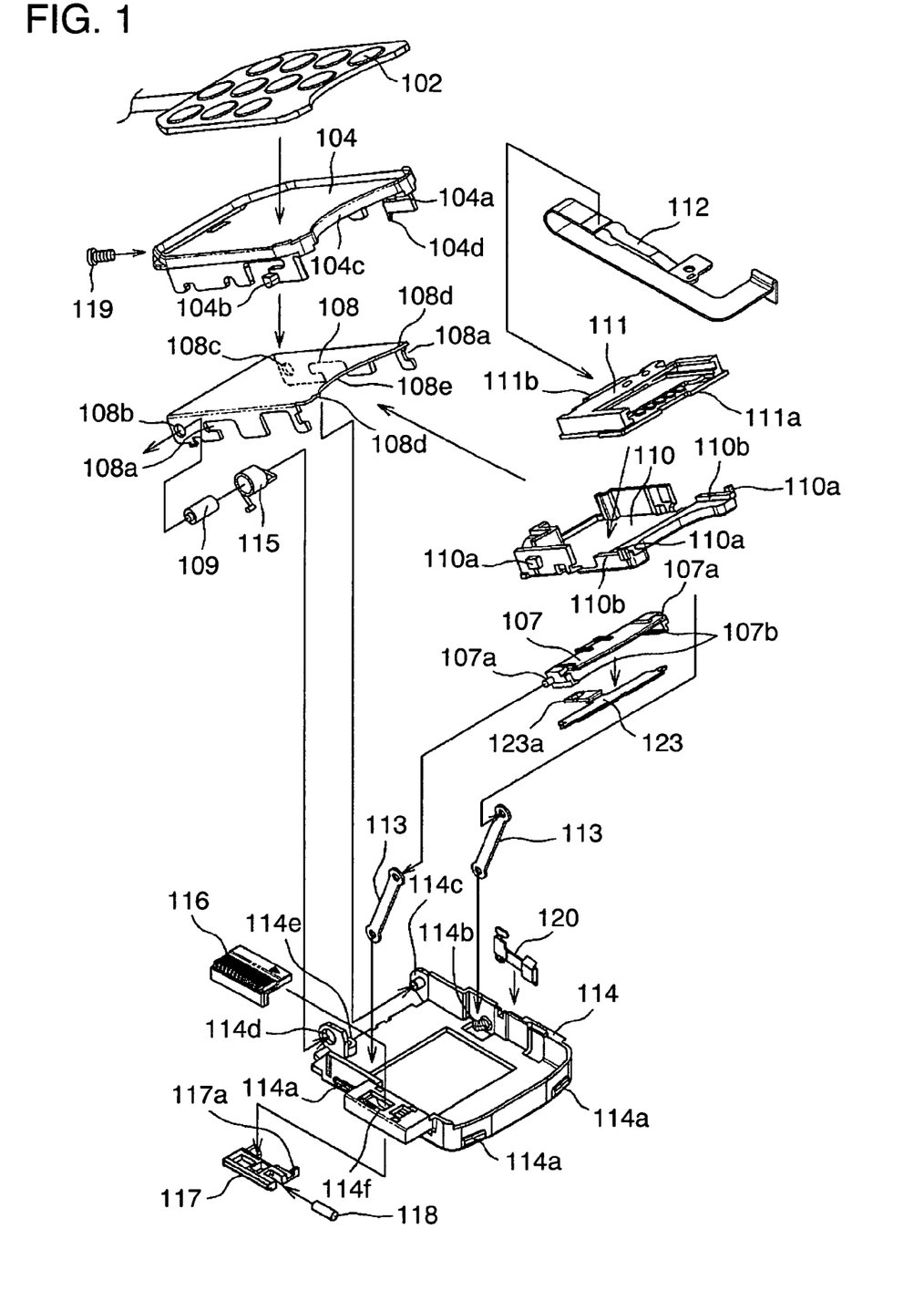
FIG. 1 is an exploded perspective view illustrating the structure of a card attachment apparatus according to an embodiment of the present invention.

FIG. 1 is an exploded perspective view illustrating the structure of a card attachment apparatus according to an embodiment of the present invention. Device operation button 102 is structured such that a flexible print substrate (hereinafter referred to as FPC) forming a pattern has thereon diaphragm-like contact points and the surface is covered by an insulation sheet (not shown). Operation button 102 is fixed to top face cover 104 by a two-sided adhesive tape.

Top face cover 104 includes top face cover cut-out section 104c. Top face cover cut-out section 104c is a cut-out section that is formed such that, when memory card 103 as a card-like recording medium (which will be described later) is taken out of opening section 105, memory card 103 is partially exposed so as to be pinched by fingers.

Card connector 111 receives and transmits, when memory card 103 is inserted to opening section 105, an electrical signal from or to an electronic circuit (not shown) included in camera 101. Card connector 111 is mounted on card print substrate 111a and is stored in and fixed to connector holder 110.

Card print substrate 111a is also mounted with flexible connector 111b for providing an electrical connection between card connector 111 and an electronic circuit of camcorder 101 as the device. Flexible connector 111b is connected with card FPC112 as a signal transmission path with camcorder 101.

Blocking cover 107 is provided in order to prevent foreign material from intruding and to improve the sophisticated taste and includes guide rib 107b. Blocking cover 107 is also stored in connector holder 110 so that guide rib 107b is loosely engaged with guide rib 110b included in connector holder 110. Blocking cover 107 is previously fixed with cover grounding plate 123 that is provided by a conductive stainless plate.

Reinforcing plate 108 is provided by a conductive stainless plate. Reinforcing plate 108 includes reinforcing plate cut-out section 108e that is formed such that memory card 103 is partially exposed. By reinforcing plate cut-out section 108e, when memory card 103 is taken out of opening section 105, memory card 103 can be pinched by fingers. Reinforcing plate 108 is also slid on connector holder 110 so as to sandwich card connector 111 and blocking cover 107 and engages four reinforcing plate engagement sections 108a with opposing holder engagement sections 110a to be temporarily fixed. In this status, spring contact point section 123a integrally formed with cover grounding plate 123 and reinforcing plate 108 are biased with a predetermined load to have an electrical conduction. Shaft hole 108b formed in reinforcing plate 108 is fixedly caulked with rotation shaft 109 provided by a conductive stainless material.

Rotation shaft 109 is attached with torsion coil spring 115 for opening an attachment unit via reinforcing plate 108. This rotation shaft 109 is coaxially provided with bearing section 108c that is opposed to shaft hole 108b and that is provided by a burring processing.

A unit assembled in the manner as described above is then constitutes the attachment unit when top face cover 104 is fixed.

In the embodiment of the present invention, blocking cover 107 is made of light-transmission polycarbonate resin so that the existence of memory card 103 is visible. Blocking cover 107 is also slightly colored blue to a level through which the existence of memory card 103 is visible, thereby providing an improved design.

A storage detection switch (which is not shown and will be hereinafter referred to as detection SW) is used for detecting a status in which top face cover 104 is closed. Holder base 114 fixes detection SW spring 120 that is used when the detection SW is pushed. Top face cover 104 also has detection SW cam section 104d that is used when detection SW spring 120 is pushed. When the detection SW detects a status in which top face cover 104 is closed, a control section (not shown) in the device disables, for a predetermined time (e.g., 2 seconds), a signal from operation button 102. The purpose of this disablement is to prevent, when top cover 104 is closed, operation button 102 from being unintentionally pushed to prevent the device from having an unintentional operation.

Holder base 114 is also assembled with a lock mechanism for maintaining top face cover 104 to be stored in a manner as described below.

First, tab attachment hole 114f formed in holder base 114 is inserted with lock canceling tab 116 from one side and is also inserted with lock piece 117 from another side. As a result, holder base 114 is slidably fixed by being engaged with an engagement nail (not shown) of lock canceling tab 116.

Between lock piece 117 and holder base 114, lock piece spring 118 is attached for returning lock canceling tab 116 to the lock status position.

Lock piece 117 has lock cam section 117a while top face cover 104 has cam follower section 104b that is engaged or disengaged with cam follower section 104b, respectively.

The respective unit thus assembled is attached by inserting rotation shaft 109 and bearing section 108c thereof to base shaft hole 114d and base shaft 114c provided in holder base 114, respectively.

Furthermore, a pair of links 113 having at both ends thereof shaft holes are attached by allowing one shaft hole to be inserted with base link shaft 114b provided in holder base 114 and by allowing the other shaft hole to be inserted with cover shaft 107*a* integrally formed in blocking cover 107, respectively.

With regards to the unit assembled in this way, top face cover 104 in which operation buttons 102 are previously fixed is covered on reinforcing plate 108 while engaging cover engagement section 104*a* thereof with reinforcing plate tip end 108*d* and is fixed by cover fixation screw 119.

Figure 2:
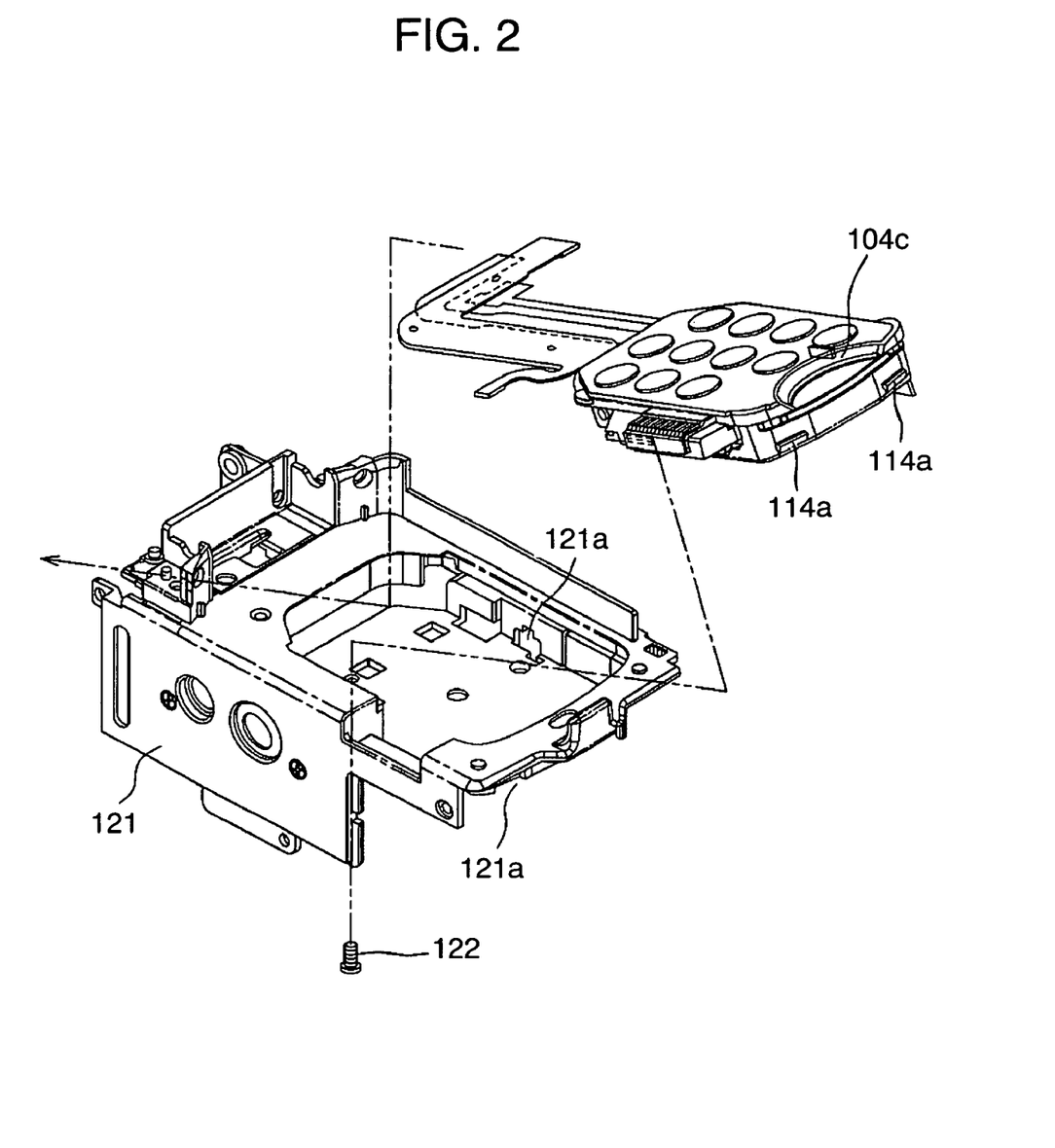
FIG. 2 is a perspective view illustrating how the card attachment apparatus according to the embodiment of the present invention is attached.

FIG. 2 shows the completed attachment unit. The attachment unit is inserted to side case 121 integrally formed in camcorder 101 and four base engagement nails 114*a* formed in holder base 114 are engaged with engagement holes 121*a* of side case 121 and are temporarily fixed. Thereafter, the attachment unit is completely fixed by tightening mechanism fixation screw 122 to base boss section 114*e*.

In this status, one end arm of torsion coil spring 115 is biased with a predetermined load toward reinforcing plate 108 while the other arm is biased with a predetermined load toward a device grounding plate (not shown) fixed to side case 121 which is a part of camcorder 101.

As a result, reinforcing plate 108 and the device grounding plate are biased so as to move away from each other and stopper sections (not shown) provided both in blocking cover 107 and reinforcing plate 108 are abutted to each other. Subsequently, the attachment unit is maintained to be at a position that protrudes from camcorder 101 with a predetermined angle (the first position at which an opening section to which or from which a card-like recording medium is inserted or pulled out).

The above configuration provides conduction from the device grounding plate (not shown) via torsion coil spring 115 and reinforcing plate 108 to cover grounding plate 123. The above configuration also allows, when memory card 103 is inserted or pulled out, static electricity from a human body to be grounded, thus preventing data recorded in memory card 103 from being destroyed by the static electricity.

The card attachment apparatus of the embodiment of the present invention having the structure as described above will be described with regards to the operation with reference to FIG. 3, FIG. 4, and FIG. 5.

Figure 3:
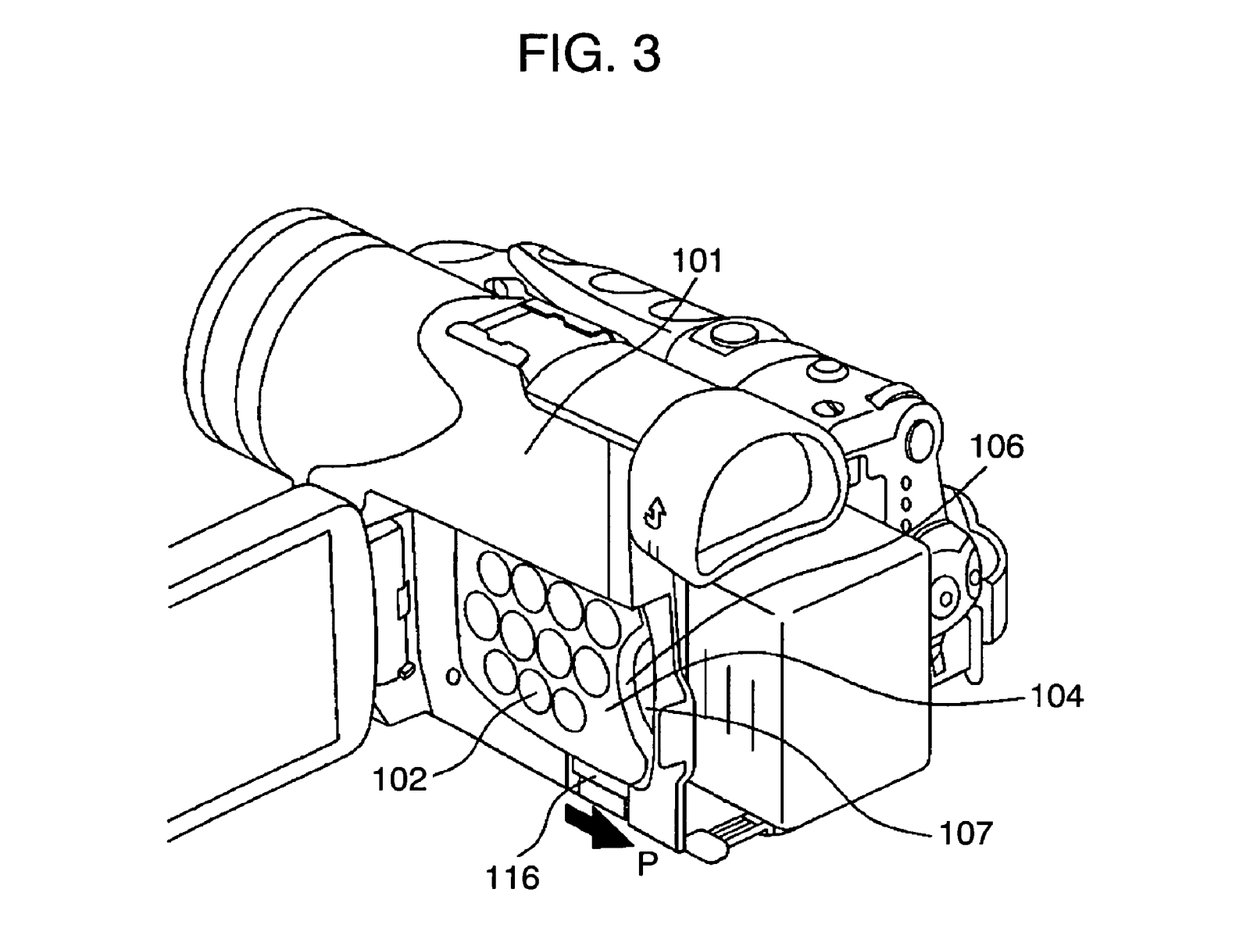
FIG. 3 is a perspective view of the main part illustrating an attachment unit of the card attachment apparatus according to the embodiment of the present invention is stored.
Figure 4:
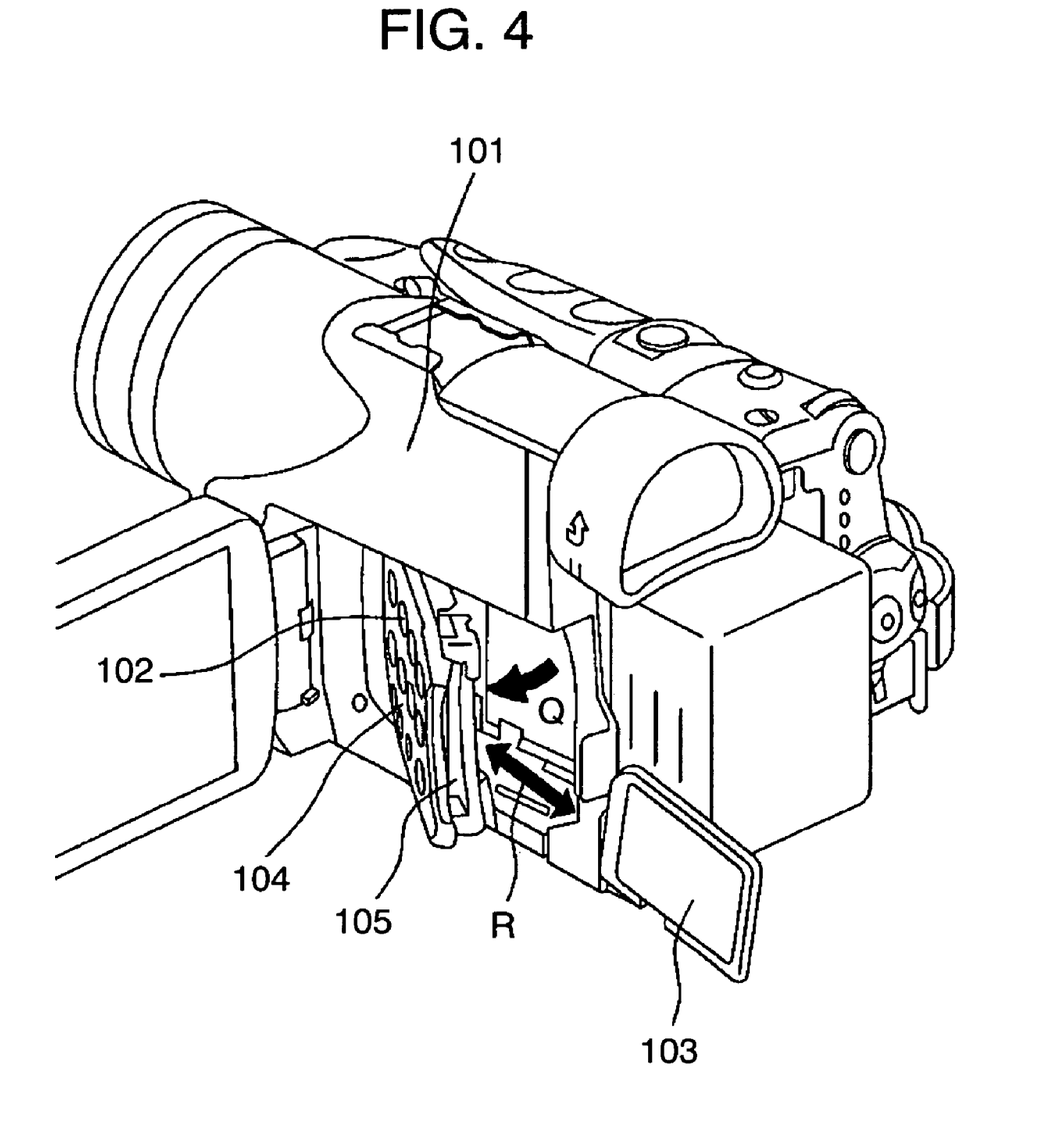
FIG. 4 is a perspective view of the main part illustrating the attachment unit of the card attachment apparatus according to the embodiment of the present invention is opened.
Figure 5:
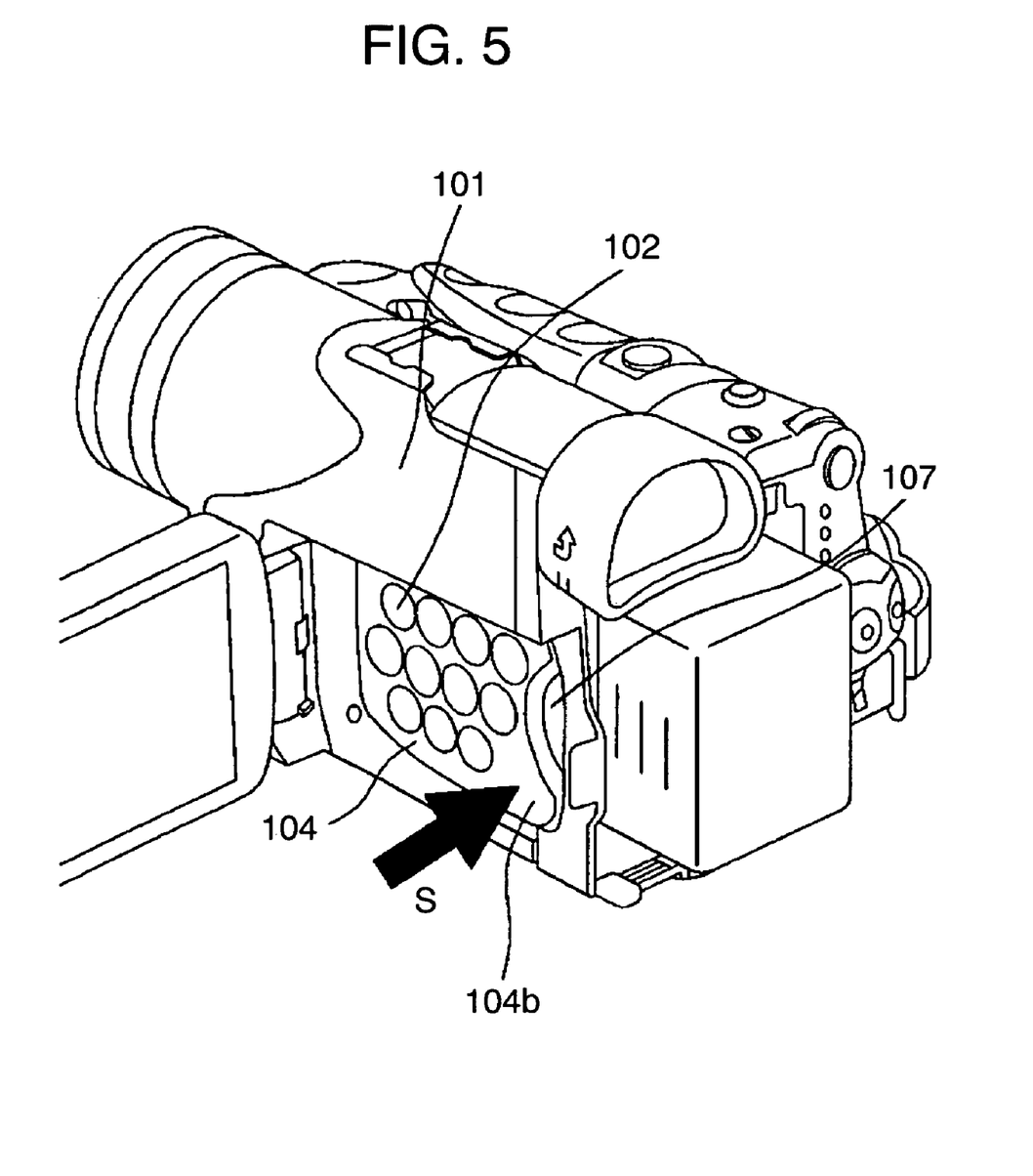
FIG. 5 is a perspective view of the main part for explaining an operation for storing the attachment unit of the card attachment apparatus according to the embodiment of the present invention.

FIG. 3, FIG. 4, and FIG. 5 illustrate how memory card 103 is inserted.

FIG. 3 shows a status in which the attachment unit of the card attachment apparatus is being stored. In this status, lock cam section 117*a* is engaged with cam follower section 104*b* and thus the card attachment apparatus is maintained to be stored. This status is assumed as a first status.

First, when lock canceling tab 116 is moved in the direction shown by arrow P, then lock cam section 117*a* is disengaged from cam follower section 104*b*. Reinforcing plate 108 and the device grounding plate are always biased so as to move away from each other.

FIG. 4 shows a status in which the attachment unit is opened. Specifically, the attachment unit is opened as shown by arrow Q until an angle is reached at which the stopper sections (not shown) provided both in blocking cover 107 and reinforcing plate 108 shown in FIG. 3 are abutted to each other (the first position at which an opening section to which or from which a card-like recording medium is inserted or pulled out). This status is assumed as a second status.

In this status, as shown by arrow R, memory card 103 can be attached or detached with or from opening section 105 provided to be surrounded by blocking cover 107 and connector holder 110. When memory card 103 is inserted and plugged into card connector 111, an electric signal can be communicated between memory card 103 and an electronic circuit (not shown) included in camcorder 101.

At this position, blocking cover 107 is attracted by link 113 shown in FIG. 1 and is stored under reinforcing plate 108. This causes memory card 103 to be partially exposed via reinforcing plate cut-out section 108*e* and top face cover cut-out section 104*c*. As a result, memory card 103 can be pushed in or pinched by fingers in a secure manner.

After the insertion of memory card 103, one end of top face cover 104 is pushed as shown by arrow S in FIG. 5 to store the attachment unit. Then, lock cam section 117*a* is engaged with cam follower section 104*b* and the attachment unit is maintained to be stored.

Although buttons or the like provided in operation button 102 attached to top face cover 104 may be provided on the entire surface, such buttons are preferably provided so as to leave a space having no buttons by which top face cover 104 can be pushed in an easier manner.

When memory card 103 is taken out, the attachment unit may be opened as in the manner at the insertion and memory card 103 exposed via reinforcing plate cut-out section 108*e* and top face cover cut-out section 104*c* may be pinched and pulled out by fingers.

As described above, according to the embodiment of the present invention, operation buttons 102 are arranged on top face cover 104 of attachment unit to eliminate the need as in the case of prior art for providing an open/close cover on the device main body. This can provide an improved sophisticated taste to the device and can eliminate a space for storing the open/close cover, thus downsizing the device main body.

In the embodiment of the present invention, memory card 103 is not limited to a memory card and may be any recording medium and does not always need to provide an electric connection so long as it can be used for signal recording or reading. For example, memory card 103 may be the one by an electromagnetic wave signal, a magnetic signal, or an optical signal.

The above configuration is provided to detect a status in which top face cover 104 is closed so that the operation by operation button 102 can be disabled until a predetermined time is reached after the detection. However, another configuration also may be provided in which the operation by operation button 102 is disabled while top face cover 104 is being opened as shown in FIG. 4. A control section for controlling them may be embodied by a microcomputer for system control, for example. If such a function is not required, a storage detection SW for detecting a status in which top face cover 104 is closed or detection SW spring 120 for pushing the storage detection SW are not essentially required.

The embodiment of the present invention provides blocking cover 107 that is formed by light transmission polycarbonate resin so as to allow memory card 103 to be visible and that is slightly colored blue to a level through which the existence of memory card 103 is visible. However, blocking cover 107 is not always required to be colored blue and also may be colored green, for example.

The above downsizing structure does not require a transparent material and also may be provided by other materials such as polyacetal.

Blocking cover 107 fixed with cover grounding plate 108 provided by a conductive stainless plate is also optional and the objective can be achieved without this structure.

The above configuration also uses a pair of links 113 to couple blocking cover 107 with holder base 114 to move blocking cover 107 so that memory card 103 is partially exposed at the first position while memory card 103 is covered at the second position. However, this is not always required. For example, the same effect can be obtained by the combination between a cam and a cam follower or the use of a gear for moving blocking cover 107.

INDUSTRIAL APPLICABILITY

As described above, the present invention can provide a card attachment apparatus having high industrial applicability that can downsize the device while maintaining the high operationality and sophisticated taste.

The invention claimed is:

1. A card attachment apparatus for attaching and detaching a card-like recording medium to a camera device, comprising:
    an attachment unit that is selectively moved between a first position at which the attachment unit is rotated against a camera device main body for a predetermined angle to project from the camera device main body so that an opening section to which or from which the card-like recording medium is inserted or pulled out is released, and a second position at which the attachment unit is stored in the camera device main body to close the opening section;
    a top face cover provided on the attachment unit for covering a card connector for attaching or detaching the card-like recording medium; and
    an operation button that is provided on the top face cover and that is used for operating the camera device,
    wherein the top face cover has at one end thereof a cut-out section for partially exposing the card-like recording medium to facilitate pinching with fingers the card-like recording medium when the attachment unit is in the first position,
    wherein the attachment unit further comprises a blocking cover for blocking the cut-out section when the attachment unit is in the second position, and is substantially withdrawn from the cut-out section when the attachment unit is in the first position; and wherein the blocking cover is provided under the top face cover.

2. The card attachment apparatus according to claim 1, wherein the blocking cover is made of a light permeability material.

3. The card attachment apparatus according to claim 1, wherein the card attachment apparatus includes a detection switch for detecting the movement from the first position to the second position and a control section for disabling, based on the result of the detection by the detection switch, the operation button for a predetermined time since the movement to the second position.

4. The card attachment apparatus according to claim 1, wherein the operation button has a pushing space when the attachment unit is moved.

5. The card attachment apparatus according to claim 1, wherein the card connector is configured for electrically connecting the card-like recording medium with the camera device.

6. The card attachment apparatus according to claim 1, wherein the card attachment apparatus is electrically connected to a case of the camera device for protecting the card-like recording medium from being destroyed by static electricity.

* * * * *